United States Patent
Izumi

(10) Patent No.: US 12,459,504 B2
(45) Date of Patent: Nov. 4, 2025

(54) VEHICLE CONTROL DEVICE

(71) Applicant: DENSO CORPORATION, Kariya (JP)

(72) Inventor: Yuusuke Izumi, Kariya (JP)

(73) Assignee: DENSO CORPORATION, Kariya (JP)

( * ) Notice: Subject to any disclaimer, the term of this patent is extended or adjusted under 35 U.S.C. 154(b) by 204 days.

(21) Appl. No.: 18/174,429

(22) Filed: Feb. 24, 2023

(65) Prior Publication Data

US 2023/0227030 A1    Jul. 20, 2023

Related U.S. Application Data

(63) Continuation of application No. PCT/JP2021/029361, filed on Aug. 6, 2021.

(30) Foreign Application Priority Data

Aug. 26, 2020 (JP) .................. 2020-142613

(51) Int. Cl.
*B60W 30/095* (2012.01)
*B60W 30/09* (2012.01)
(Continued)

(52) U.S. Cl.
CPC .......... *B60W 30/095* (2013.01); *B60W 30/09* (2013.01); *B60W 30/18159* (2020.02);
(Continued)

(58) Field of Classification Search
CPC ........ B60K 28/00; B60K 28/02; B60K 28/04; B60K 28/06; B60K 28/063; B60K 28/066; B60K 28/08; B60K 28/10; B60K 28/12; B60K 28/14; B60K 28/16; B60K 28/165; B60K 2028/003; B60K 2028/006; B60T 7/12; B60W 10/18; B60W 30/08; B60W 30/09-0956; B60W 30/12; B60W 30/16; B60W 30/162; B60W 30/165; B60W 30/17; B60W 30/18159; B60W 30/182;
(Continued)

(56) References Cited

U.S. PATENT DOCUMENTS 10,679,502 B2 *  6/2020  Baba ............... B60W 30/09
11,001,256 B2 *  5/2021  Packer ............ B60W 30/0956
(Continued)

FOREIGN PATENT DOCUMENTS

JP    2011-121491 A    6/2011
JP    2019-153052 A    9/2019

*Primary Examiner* — Mark L. Greene
(74) *Attorney, Agent, or Firm* — Maschoff Brennan

(57) ABSTRACT

A vehicle control device is provided for activating a safety device to inhibit occurrence of a collision with a moving object around an own vehicle, when the own vehicle transitions from traveling straight in a lane in which the vehicle is traveling to making a turn. An area setting unit is configured to, based on at least one of an own vehicle speed and a moving object speed, set a potential collision area, provided that the moving object continues to move in its moving direction and the own vehicle is making a right/left turn. An acquisition unit is configured to acquire a position of the moving object relative to the own vehicle. A restriction unit is configured to restrict activation of the safety device against the moving object based on the position of the moving object being out of the potential collision area.

13 Claims, 12 Drawing Sheets

(51) Int. Cl.
*B60W 30/18* (2012.01)
*B60W 10/18* (2012.01)

(52) U.S. Cl.
CPC ......... *B60W 10/18* (2013.01); *B60W 2520/10* (2013.01); *B60W 2554/4041* (2020.02); *B60W 2554/4042* (2020.02); *B60W 2554/801* (2020.02)

(58) Field of Classification Search
CPC ........... B60W 50/082; B60W 2554/00; B60W 2554/4041; B60W 2554/4042; B60W 2554/80; B60W 2554/801; G05D 1/0061; G05D 1/0088; G05D 1/021; G05D 1/0214; G05D 1/0221; G05D 1/0223
See application file for complete search history.

(56) References Cited

U.S. PATENT DOCUMENTS

| | | |
|---|---|---|
| 2018/0118202 A1 | 5/2018 | Shimizu et al. |
| 2020/0239021 A1 | 7/2020 | Igarashi et al. |

\* cited by examiner

VEHICLE CONTROL DEVICE

CROSS-REFERENCE TO RELATED APPLICATION

This application is a continuation application of International Application No. PCT/JP2021/029361 filed Aug. 6, 2021 which designated the U.S. and claims priority to Japanese Patent Application No. 2020-142613 filed with the Japan Patent Office on Aug. 26, 2020, the contents of each of which are incorporated herein by reference.

BACKGROUND

Technical Field

The present disclosure relates to a vehicle control device.

Related Art

Conventionally, a device is known for detecting another vehicle in the vicinity of an own vehicle and predicting a collision between the detected other vehicle and the own vehicle. Such a known device predicts a collision between the own vehicle and another vehicle based on a relative time-to-collision, which is a time-to-collision calculated by dividing a relative distance between the own vehicle and the other vehicle by a relative speed therebetween.

DESCRIPTION OF SPECIFIC EMBODIMENTS

Figure 1A:
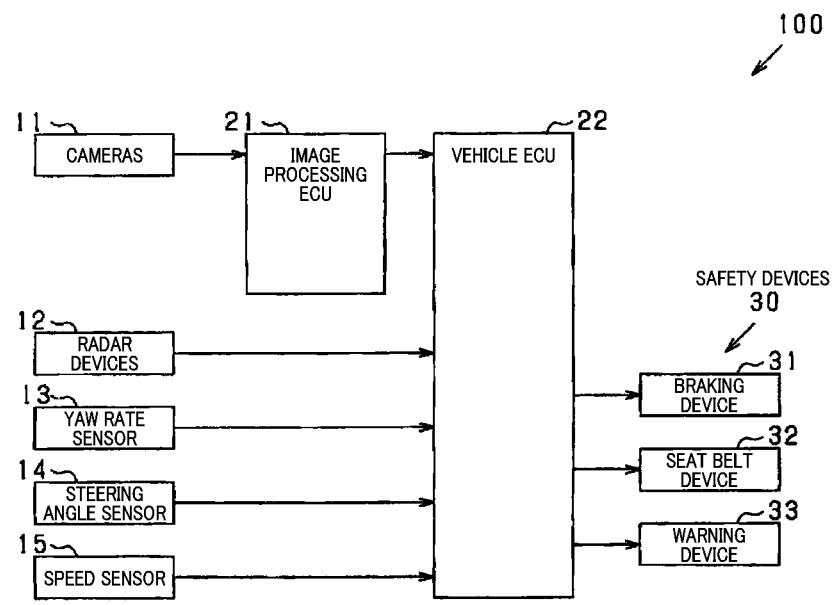
FIG. 1A is an illustration of an overall configuration of a driving assistance apparatus.

In the above known device as disclosed in JP 2011-121491 A, for example, at an intersection on a left-hand traffic road, when the own vehicle traveling straight forward makes a right turn, that is, turns to cross the oncoming lane, a path of travel of the own vehicle and a path of travel of the oncoming vehicle traveling straight forward in the oncoming lane intersect each other. In such a case, the oncoming vehicle may make a right turn or slip past the front of the own vehicle while the own vehicle is making a turn. In these scenes, the smaller the relative distance, the shorter the relative time-to-collision. Thus, there is a concern that safety devices may be activated unnecessarily regardless of the relative speed. Such an issue is not specific to the oncoming vehicle traveling straight forward in the oncoming lane, but is also common to moving objects, such as bicycles or the like traveling in the vicinity of the own vehicle.

In view of the foregoing, it is desired to have a control device capable of suppressing unnecessary activation of safety devices when the own vehicle makes a right/left turn.

One aspect of the present disclosure provides a vehicle control device for activating a safety device to inhibit occurrence of a collision with a moving object around an own vehicle, when the own vehicle transitions from traveling straight in a lane in which the vehicle is traveling to making a turn. In the vehicle control device, an area setting unit is configured to, based on at least one of an own vehicle speed, which is a speed of the own vehicle, and a moving object speed, which is a speed of the moving object, set a potential collision area where the own vehicle is likely to collide with the moving object, provided that the moving object continues to move in its moving direction and the own vehicle is making a left/right turn, An acquisition unit is configured to acquire a position of the moving object relative to the own vehicle. A restriction unit configured to restrict activation of the safety device against the moving object based on the position of the moving object acquired by the acquisition unit being out of the potential collision area set by the area setting unit.

For example, in the case of making a right turn at an intersection on a left-hand traffic road, in a configuration in which the safety device is activated based on the relative time-to-collision, which is a collision-to-time calculated by dividing the relative distance between the own vehicle and the oncoming vehicle by the relative speed, there is concern that, when an oncoming vehicle turns right or when an oncoming vehicle slips past the own vehicle, the relative time-to-collision may be reduced due to a smaller relative distance, and the safety device may be activated unnecessarily regardless of the relative speed.

In this regard, in the above configuration, based on either of the own vehicle speed and the moving object speed, the potential collision area is set as an area where the own vehicle is likely to collide with the moving object when the moving object moves in its moving direction and the own vehicle makes a right/left turn. Based on the position of the moving object relative to the own vehicle being out of the potential collision area, activation of the safety device against the moving object is restricted. When the own vehicle makes a right/left turn, the assumed position of the moving object may differ according to the own vehicle speed and the moving object speed. Thus, the potential collision area is set based on at least one of own vehicle speed and the moving object speed, which may allow the position of the moving object to be properly determined. This may properly inhibit unnecessary activation of the safety device when the own vehicle makes a right/left turn.

EMBODIMENTS

An embodiment in which a vehicle control device according to the present disclosure is applied to a driving assistance apparatus 100 mounted to a vehicle will now be described with reference to the accompanying drawings.

As illustrated in FIG. 1A, the driving assistance apparatus 100 of the present embodiment includes cameras 11, radar devices 12, an image processing electronic control unit (ECU) 21, a vehicle ECU 22 as the vehicle control device, and safety devices 30. A vehicle carrying the driving assistance apparatus 100 is referred to as an own vehicle Each camera 11 is, for example, a monocular camera. The cameras 11 are respectively attached to the front end, the rear end, and left and right sides of the own vehicle, and capture images of surroundings of the own vehicle. Each camera 11 transmits image information of the captured images to the image processing ECU 21.

Each radar device 12 is, for example, a ranging device that uses millimeter-wave band high-frequency signals (ultrasonic waves) as transmission waves. The radar devices 12 are respectively mounted to the front end, the rear end, and left and right sides of the own vehicle, and measure a distance to each object around the own vehicle. Specifically, each radar device 12 transmits a probe wave every predefined cycle and receives its reflected waves using a plurality of antennas. A distance to each object is measured by detecting a plurality of detection points on the object based on the time of transmission of the probe wave and times of reception of its reflected waves. In addition, an azimuth of the object is calculated based on a phase difference of the reflected waves received by the plurality of antennas. Upon the distance and the azimuth of the object being successfully calculated, the position of the object relative to the own vehicle can be determined.

Each radar device 12 calculates a movement speed of each object based on a change in frequency of the reflected wave reflected by the object due to the Doppler effect. This allows whether the object around the own vehicle is a stationary object or a moving object to be detected. Specifically, an object is detected as a stationary object when the sum of the movement speed of the object and the travel speed of the own vehicle is zero. An object is detected as a moving object when the sum of the movement speed of the object and the travel speed of the own vehicle is not zero. Each radar device 12 transmits stationary-object detection information directed to stationary objects around the own vehicle and moving-object detection information directed to moving objects around the own vehicle, to the vehicle ECU 22.

Each of the ECUs 21 and 22 is a control unit that includes a well-known microcomputer formed of a central processing unit (CPU), a read-only memory (ROM), a random-access memory (RAM), a flash memory, and other components. The ECUs 21 and 22 acquire various signals and perform various control based on the acquired information.

Figure 1B:
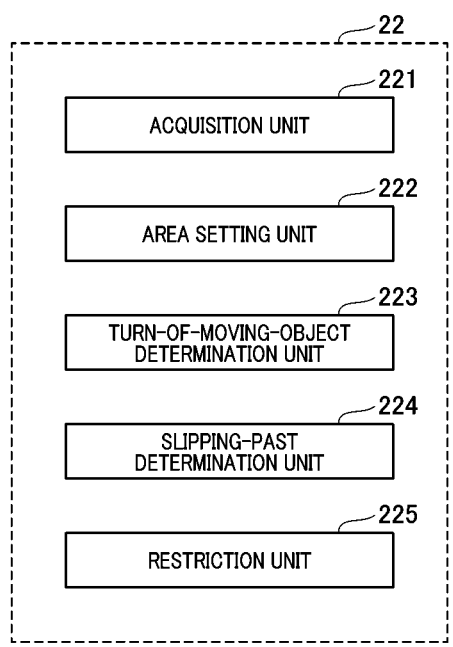
FIG. 1B is a functional block diagram of a vehicle ECU.

FIG. 1B illustrates functional block diagrams including an acquisition unit 221, an area setting unit 222, a turn-of-moving-object determination unit 223, a slipping-past determination unit 224, and a restriction unit 225. For example, functions of these functional blocks may be implemented by the CPU executing a program stored in the ROM.

The image processing ECU 21 detects moving objects around the own vehicle based on the images captured by the cameras 11. Specifically, the image processing ECU 21 calculates a relative position of each object to the own vehicle in the captured images from the cameras 11. The image processing ECU 21 calculates the moving speed of each object based on this relative position. The image processing ECU 21 calculates an optical flow of each object based on the image information transmitted from the cameras 11 every predefined cycle and calculates the movement speed of the object based on the calculated optical flow. The optical flow is a motion vector representing of movement of a plurality of boundary points that are detected as points forming a boundary line across which the luminance changes in the captured image. The moving objects present around the own vehicle are thereby detected.

The image processing ECU 21 calculates a path of travel of each moving object based on the relative position and relative speed of the moving object. The image processing ECU 21 calculates the path of travel of each moving object based on the images captured by the cameras 11. The image processing ECU 21 transmits moving-object detection information directed to moving objects around the own vehicle to the vehicle ECU 22. The moving-object detection information includes information about the relative position, relative speed, and path of travel of each detected moving object relative to the own vehicle.

The vehicle ECU 22 actuates the safety devices 30 based on the moving-object detection information directed to moving objects around the own vehicle transmitted from the radar devices 12 and the image processing ECU 21. The safety devices 30 are configured to avoid a collision between the own vehicle and each object or reduce collision damages, and include a braking device 31, a seat belt device 32, and a warning device 33.

The braking device 31 decelerates the own vehicle based on a collision avoidance signal output from the vehicle ECU 22. Based on the collision avoidance signal output from the vehicle ECU 22, the seatbelt device 32 winds up the seatbelt to tighten the seatbelt. The warning device 33 is configured to notify the driver or the like of a collision being likely to occur based on the collision avoidance signal output from the vehicle ECU 22. The warning device 33 may include an auditory warning device, such as a speaker or a buzzer, or a visual warning device, such as a display, which are installed in the cabin of the own vehicle.

The vehicle ECU 22 is connected to a yaw rate sensor 13, a steering angle sensor 14, and a vehicle speed sensor 15. The yaw rate sensor 13 is installed, for example, at the center of the own vehicle, and outputs a yaw rate signal corresponding to a rate of change in amount of steering of the own vehicle to the vehicle ECU 22. The steering angle sensor 14 is attached to, for example, the steering column of the own vehicle, and outputs a steering angle signal corresponding to a change in steering angle of the steering wheel caused by the driver's operation. The steering angle sensor 14 outputs the steering angle signal to the vehicle ECU 22. The speed sensor 15 is attached to, for example, a wheel of the own vehicle and detects a direction of rotation of the wheel and outputs a vehicle speed signal corresponding to a wheel speed to the vehicle ECU 22.

For example, the vehicle ECU 22 detects another vehicle as a moving object around the own vehicle and performs collision-inhibiting control to activate the safety devices 30 based on a relative time-to-collision (TTC) acquired by dividing a relative distance RTD between the own vehicle and the other vehicle by a relative speed RV between the own vehicle and the other vehicle. Here, a distance acquired by combining (fusing) the relative distance transmitted from the radar device 12 and the relative distance transmitted from the image processing ECU 21 may be used as the relative distance RTD. A speed acquired by combining (fusing) the relative speed transmitted from the radar device 12 and the relative speed transmitted from the image processing ECU 21 may be used as the relative speed RV.

Figure 2:
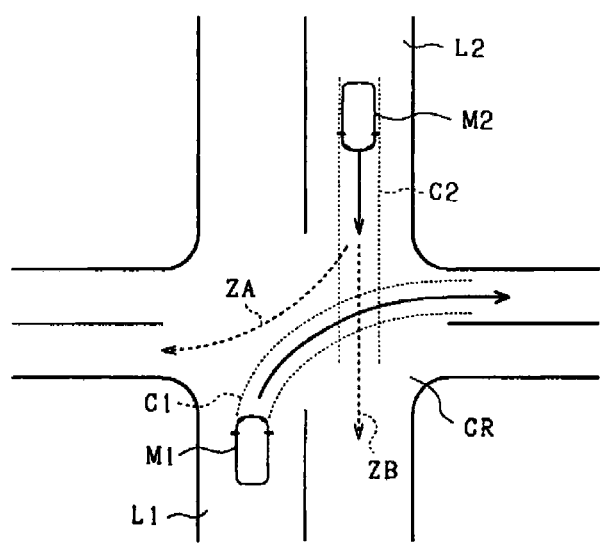
FIG. 2 is an illustration of a positional relationship between an own vehicle and an oncoming vehicle when the own vehicle is making a right turn.

By the way, as illustrated in FIG. 2, the own vehicle M1 that is traveling straight forward in its own lane L1 may turn to cross the oncoming lane L2 by making a right turn at an intersection CR. In such a case, since the path of travel C1 of the own vehicle M1 and the path of travel C2 of the oncoming vehicle M2 that is another vehicle traveling straight forward in the oncoming lane L2 intersect, the vehicle ECU 22 activates the safety devices 30 to inhibit occurrence of a collision with the oncoming vehicle M2. In the configuration where all or some of the safety devices 30 (i.e., at least one safety device 30) are activated based on the relative time-to-collision TTC, there is a concern that in a scene where the oncoming vehicle M2 turns right as indicated by the arrow ZA while the own vehicle M1 is turning right, or where the oncoming vehicle M2 slips past the front of the own vehicle M1 as indicated by the arrow ZB while the own vehicle M1 is turning right, the relative time-to-collision TTC may become small, leading to a small relative distance RTD. Thus, there is concern that the safety devices 30 may be activated unnecessarily regardless of the relative speed RV.

In collision-inhibiting control of the present embodiment, specific areas EA-EC are set. The safety devices 30 are activated based on whether the oncoming vehicle M2 is located in any one of the areas EA-EC. In collision-inhibiting control, the following three areas EA-EC are set as the specific areas EA-EC.

Figure 5A:
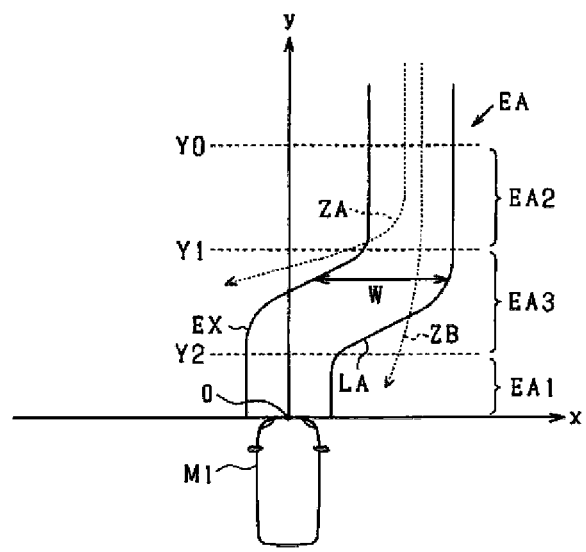
FIGS. 5A and 5B are an illustration of a potential collision area for an oncoming vehicle.

First, a potential collision area EA is set. As illustrated in FIG. 5A, the potential collision area EA is set in a coordinate system with the x-axis in the lateral direction of the own vehicle M1, the y-axis in the direction of travel of the own vehicle M1, and the position of the own vehicle as the origin, i.e., in a first coordinate system with reference to the orientation of the own vehicle M1. The potential collision area EA is set as an area where the own vehicle M1 is likely to collide with the oncoming vehicle M2 when the oncoming vehicle M2 is traveling straight forward from the oncoming side and the own vehicle M1 is traveling forward while turning right. The potential collision area EA is set based on the speed V1 of the own vehicle M1 and the speed V2 of the oncoming vehicle M2, and the details of which are described later.

In collision-inhibiting control, the position of the oncoming vehicle M2 relative to the own vehicle M1 is acquired, and based on the acquired position of the oncoming vehicle M2 being out of the potential collision area EA, actuation of the safety devices 30 against the oncoming vehicle M2 is restricted. In this case, the likelihood of a collision with the oncoming vehicle M2 can be determined properly with reference to the orientation of the own vehicle M1 in a turning state. In particular, in a scene where the oncoming vehicle M2 turns right toward the own vehicle M1 when the own vehicle M1 is turning right toward the oncoming vehicle M2, as indicated by the arrow ZA, or where the oncoming vehicle M2 slips past the front of the own vehicle M1 when the own vehicle M1 is turning right, as indicated by the arrow ZB, the position of the oncoming vehicle M2 relative to the own vehicle M1 is out of the collision potential area EA, such that unnecessary activation of the safety devices 30 may be suppressed. In the present embodiment, the right turn is an example of right/left turn and the oncoming vehicle M2 is an example of a moving object.

Second, a right-turn-of-oncoming-vehicle determination area EB is set. As illustrated in FIG. 7, the right-turn-of-oncoming-vehicle determination area EB is set in a second coordinate system with the lateral distance CTD as the x-axis and the relative distance RTD as the y-axis. Here, the lateral distance CTD is a distance between the own vehicle M1 and the oncoming vehicle M2 in the lateral direction DY (see FIG. 6) that a direction orthogonal to the straight travel direction DX in which the oncoming vehicle M2 moves when traveling straight forward. The right-turn-of-oncoming-vehicle determination area EB is set such that the relative distance RTD is greater than a first relative threshold Rth1 and the lateral distance CTD is less than a first lateral threshold Dth1.

In collision-inhibiting control, when the own vehicle M1 turns right, it is determined whether the position of the oncoming vehicle M2 relative to the own vehicle M1 has entered the right-turn-of-oncoming-vehicle determination area EB, that is, it is determined whether the lateral distance CTD becomes less than the first lateral direction threshold Dth1 before the relative distance RTD becomes less than the first relative threshold Rth1. In response to determining that the position of the oncoming vehicle M2 relative to the own vehicle M1 has entered the right-turn-of-oncoming-vehicle determination area EB, activation of the safety devices 30 against the oncoming vehicle M2 is restricted. In this case, use of the lateral distance CTD and the relative distance RTD allows the likelihood of a collision with the oncoming vehicle M2 to be determined properly. In particular, in the scene where the oncoming vehicle M2 turns right toward the own vehicle M1 when the own vehicle M1 is turning right toward the oncoming vehicle M2, as indicated by the arrow ZA, the lateral distance CTD becomes less than the first lateral threshold Dth1 before the relative distance RTD becomes less than the first relative threshold Rth1, which can inhibit unnecessary actuation the safety devices 30.

Figure 10:
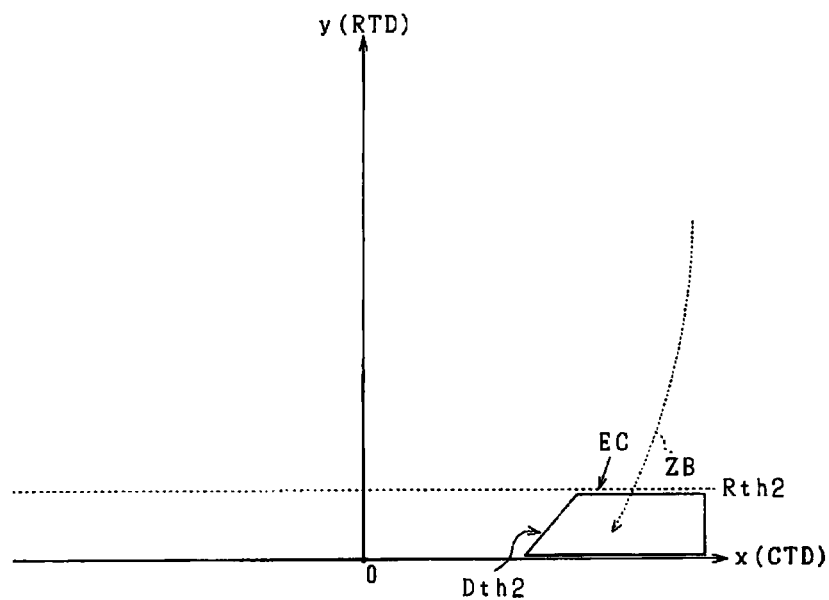
FIG. 10 is an illustration of a slipping-past determination area.

Third, a slipping-past determination area EC is set. As illustrated in FIG. 10, the slipping-past determination area EC is set in the second coordinate system. The slipping-past determination area EC is set such that the relative distance RTD is less than a second relative threshold Rth2 and the lateral distance CTD is greater than a second lateral threshold Dth2.

In collision-inhibiting control, it is determined whether the position of the oncoming vehicle M2 relative to the own vehicle M1 has entered the slipping-past determination area EC when the own vehicle M1 makes a right turn, that is, whether the lateral distance CTD is greater than the second lateral threshold Dth2 after the relative distance RTD becomes less than the second relative threshold Rth2, and in response to determining that the position of the oncoming vehicle M2 relative to the own vehicle M1 has entered the slipping-past determination area EC, the operations of the safety devices 30 targeting the oncoming vehicle M2 is restricted. In this case, the lateral distance CTD and the relative distance RTD may be used to properly determine the likelihood of a collision with the oncoming vehicle M2. In particular, in a scene where the oncoming vehicle M2 slips past the front of the own vehicle M1 while the own vehicle M1 is turning right, as indicated by the arrow ZB, the lateral distance CTD remains greater than the second lateral threshold Dth2 after the relative distance RTD becomes less than the second relative threshold Rth2, which can inhibit unnecessary actuation of the safety devices 30.

Figure 3:
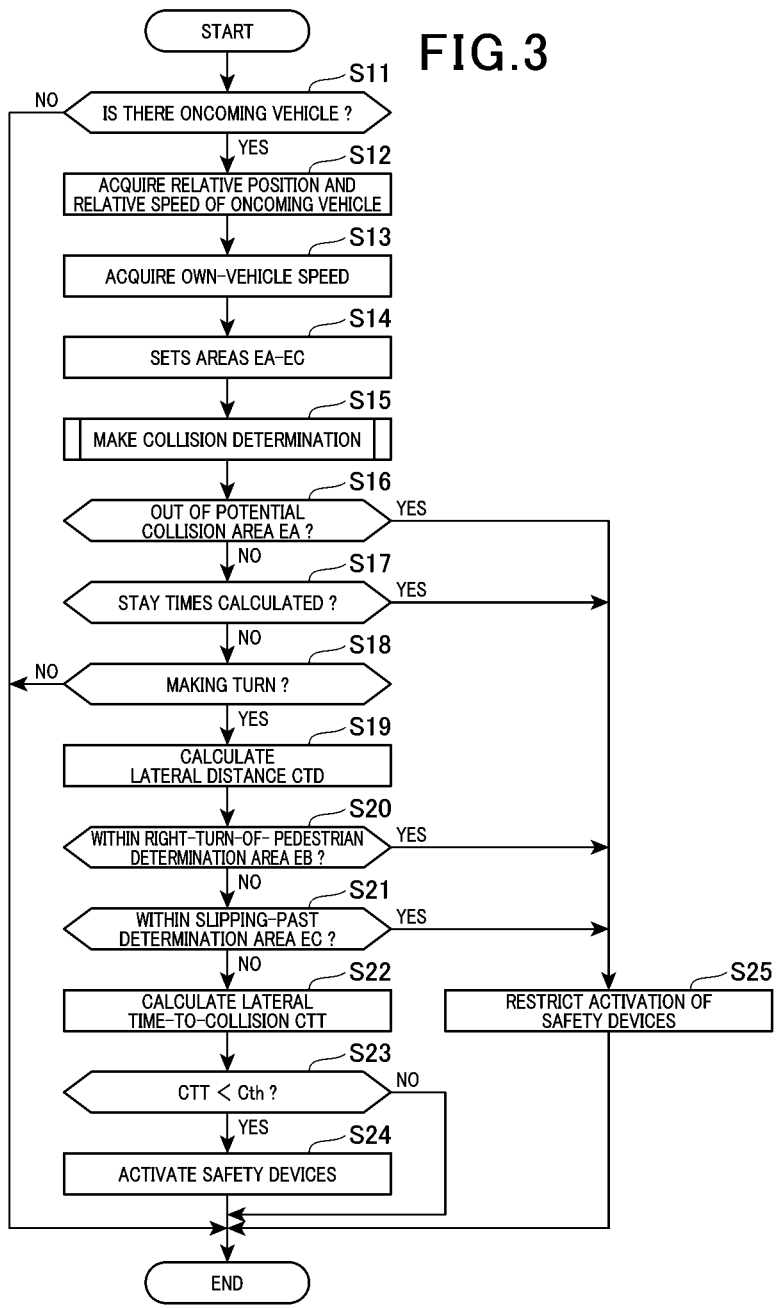
FIG. 3 is a flowchart of a collision-inhibiting control process against an oncoming vehicle.

FIG. 3 illustrates a flowchart of collision-inhibiting control in the present embodiment. The vehicle ECU 22 repeatedly performs collision-inhibiting control at predefined intervals while the own vehicle M1 is traveling.

Upon initiating collision-inhibiting control, first, at step S11, the vehicle ECU 22 determines whether there is an oncoming vehicle M2 traveling straight forward in the oncoming lane L2, based on moving object detection information transmitted from the radar device 12 and the image processing ECU 21. If the answer is "NO" at step S11, the vehicle ECU 22 terminates the collision-inhibiting control. If the answer is "YES" at step S11, at step S12, the vehicle ECU 22 acquires a relative position of the oncoming vehicle M2 as position information of the oncoming vehicle M2 relative to the own vehicle M1 and a relative speed RV of the oncoming vehicle M2 as speed information of the oncoming vehicle M2 relative to the own vehicle M1. In the present embodiment, the acquisition unit 221 illustrated in FIG. 1B is responsible for execution of the process step S12.

At step S13, the vehicle ECU 22 acquires the own-vehicle speed V1 of the own vehicle M1 based on the vehicle speed signal from the vehicle speed sensor 15. Acquisition of the own-vehicle speed V1 of the own vehicle M1 and the relative speed RV of the oncoming vehicle M2 enables calculation of the oncoming-vehicle speed V2 of the oncoming vehicle M2. At step S14, the vehicle ECU 22 sets areas EA-EC based on the own-vehicle speed V1 and the oncoming-vehicle speed V2. The specific setting method for the respective areas EA-EC will be described later. In the present embodiment, the area setting unit 222 illustrated in FIG. 1B is responsible for execution of the process step S14. A moving object speed corresponds to the oncoming-vehicle speed V2.

Then, at step S15, the vehicle ECU 22 performs a collision determination process to determine the likelihood of a collision between the own vehicle M1 and the oncoming vehicle M2 using the potential collision area EA. The collision determination process will be described with reference to the flowchart in FIG. 4.

Figure 4:
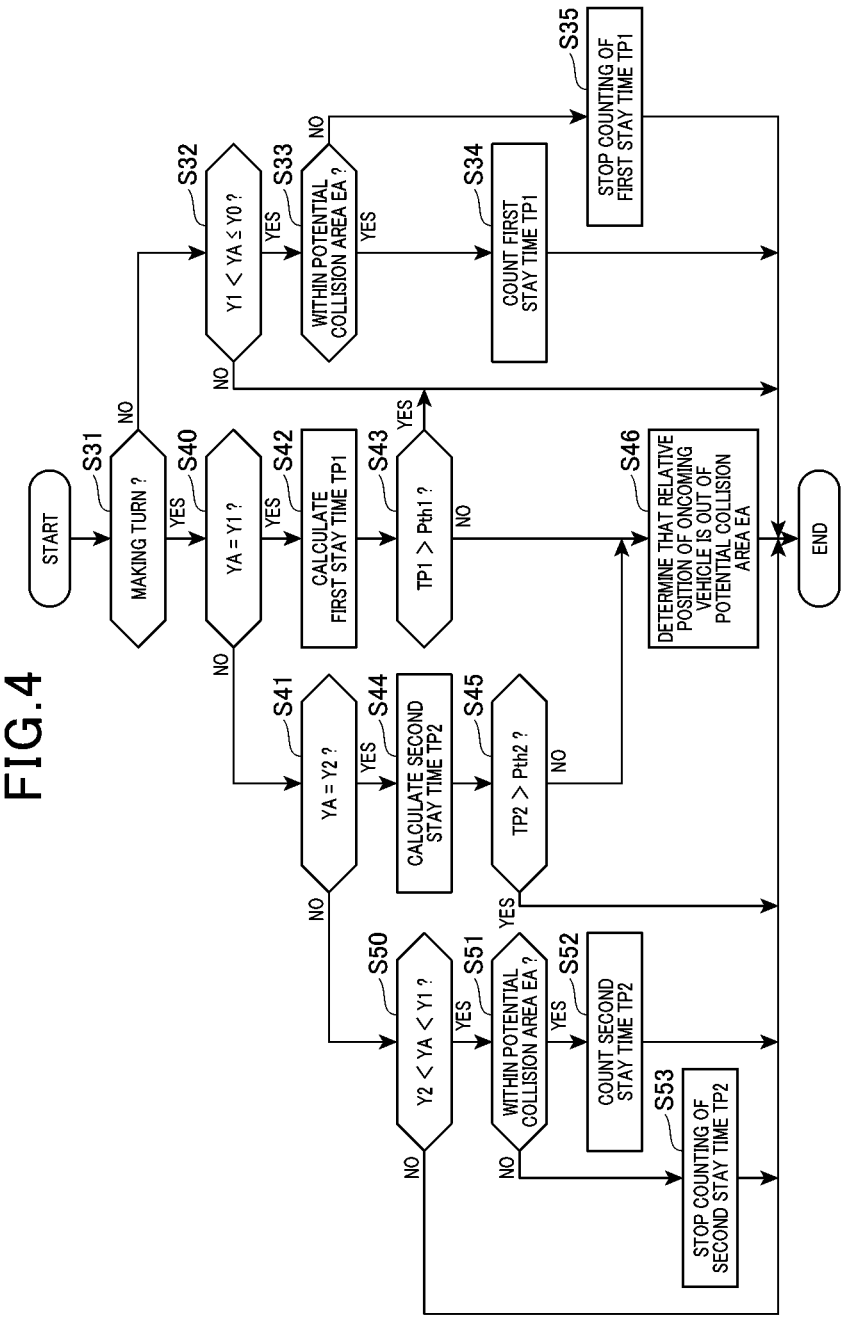
FIG. 4 is a flowchart of a collision determination process.

Referring to FIG. 4, at step S31, the vehicle ECU 22 determines whether the own vehicle M1 has started to make a right turn from traveling straight forward, that is, whether the own vehicle M1 is making a turn. If the own vehicle M1 is traveling straight forward, the answer is "NO" at step S31, and the vehicle ECU 22 proceeds to step S32. If it is determined that the own vehicle M1 has already started to make a right turn, or that the own vehicle M1 has just started to transition from traveling straight forward to making a right turn, the answer is "YES" at step S31 and the vehicle ECU 22 proceeds to steps S40 and S41.

At step S32, the vehicle ECU 22 determines whether the first Y-axis position YA, which is a relative position of the oncoming vehicle M2 on the Y-axis in the first coordinate system, is less than or equal to the reference position Y0 and greater than the first position Y1. Here, the first Y-axis position YA indicates the front-end center position of the oncoming vehicle M2, and the reference position Y0 indicates the Y-axis directional far-side end position of the potential collision area EA. The first position Y1 indicates a position on the origin side of the reference position Y0, and the first Y-axis position YA becomes the first position Y1 at the start of transition of the own vehicle M1 from traveling straight forward to making a turn. If the first Y-axis position YA is greater than the reference position Y0, the answer is "NO" at step S32 and the vehicle ECU 22 terminates collision determination process. If the first Y-axis position YA is less than or equal to the reference position Y0 and greater than the first position Y1, the answer is "YES" at step S32 and the vehicle ECU 22 proceeds to step S33.

At step S33, the vehicle ECU 22 determines whether the relative position of the oncoming vehicle M2 acquired at step S12 is within the potential collision area EA. The potential collision area EA is set in a predefined X-axis range on the Y-axis directional near side of the reference position Y0. When the oncoming vehicle M2 is traveling straight forward in the oncoming lane L2 before transition of the own vehicle M1 from traveling straight forward to making a turn, the first X-axis position XA, which is a relative position of the oncoming vehicle M2 on the X-axis in the first coordinate system, is within the X-axis range of the potential collision area EA corresponding to the first Y-axis position YA. That is, since the relative position of the oncoming vehicle M2 is within the potential collision area EA, the answer is "YES" at step S33 and the vehicle ECU 22 proceeds to step S34. At step S34, the vehicle ECU 22 counts a first stay time TP1 that is a length of time for which the relative position of the oncoming vehicle M2 continues to stay in the potential collision area EA from when the first Y-axis position YA passes through the reference position Y0 to when the first Y-axis position YA passes through the first position Y1, and then terminates collision determination process. A length of time to the start of the next collision determination process is counted at step S34 as the first stay time TP1.

If the oncoming vehicle M2 makes a turn before transition of the own vehicle M1 from traveling straight to making a turn, the first X-axis position XA becomes out of the X-axis range of the potential collision area EA corresponding to the first Y-axis position YA. In such a case, since the relative position of the oncoming vehicle M2 is out of the potential collision area EA, the answer is "NO" at step S33, and the vehicle ECU 22 proceeds to step S35. At step S35, the vehicle ECU 22 stops counting of the first stay time TP1 and terminates collision determination process. By stopping counting of the first stay time TP1 at step S35, a length of time to the start of the next collision determination process ceases to be counted as the first stay time TP1.

At steps S40, S41, the vehicle ECU 22 determines whether the first Y-axis position YA is the first position Y1 or the second position Y2. The second position Y2 indicates a position on the origin side of the first position Y1, and upon the first Y-axis position YA becoming the second position Y2, the vehicle ECU 22 activates the safety devices 30 against the oncoming vehicle M2. If the answer is "YES" at step S40, the vehicle ECU 22 proceeds to step S42. If the answer is "NO" at step S40 and the answer is "YES" at step S41, the vehicle ECU 22 proceeds to step S44. If the answer is "NO" at step S40 and the answer is "NO" at step S41, the vehicle ECU 22 proceeds to step S50.

At step S50, the vehicle ECU 22 determines whether the first Y-axis position YA is less than or equal to the first position Y1 and greater than the second position Y2. If the first Y-axis position YA is less than the second position Y2, the answer is "NO" at step S50, and the vehicle ECU 22 terminates the collision determination process. If the first Y-axis position YA is less than or equal to the first position Y1 and greater than the second position Y2, then the answer is "YES" at step S50 and the vehicle ECU 22 proceeds to step S51.

At step S51, the vehicle ECU 22 determines whether the relative position of the oncoming vehicle M2 acquired at step S12 is within the potential collision area EA. Since processing at step S51 is similar to that at step S33, a detailed description will be omitted. If the answer is "YES" at step S51, the vehicle ECU 22 proceeds to step S52. At step S52, the vehicle ECU 22 counts a second stay time TP2 that is a length of time for which the relative position of the oncoming vehicle M2 continues to stay in the potential collision area EA from when the first Y-axis position YA passes through the reference position Y0 to when the first Y-axis position YA passes through the second position Y2, and then terminates collision determination process. A length of time to the start of the next collision determination process is counted at step S52 as the second stay time TP2.

If the answer is "NO" at step S51, the vehicle ECU 22 proceeds to step S53. At step S53, the vehicle ECU 22 stops counting of the second stay time TP2 and terminates collision determination process. By stopping counting of the second stay time TP2 at step S53, a length of time to the start of the next collision determination process ceases to be counted as the second stay time TP2.

At step S42, the vehicle ECU 22 calculates the first stay time TP1 based on the counting process at steps S34 and S35. At step S43, the vehicle ECU 22 determines whether the first stay time TP1 calculated at step S42 is greater than a predefined first time threshold Pth1. Here, the first-time threshold Pth1 is set to 80% of the first stay time TP1 if the relative position of the oncoming vehicle M2 continues to stay in the potential collision area EA from when the first Y-axis position YA passes through the reference position Y0 to when the first Y-axis position YA passes through the first position Y1. If the relative position of the oncoming vehicle M2 is less frequently out of the potential collision area EA during a time period from when the first Y-axis position YA passes through the reference position Y0 to when the first Y-position YA passes through the first position Y1, the first stay time TP1 is likely to be greater than the first time threshold Pth1. Therefore, the answer is "YES" at step S43, the vehicle ECU 22 terminates the collision determination process.

If the relative position of the oncoming vehicle M2 is more frequently out of the potential collision area EA during a time period from when the first Y-axis position YA passes through the reference position Y0 to the first Y-position YA passes through the first position Y1, the first stay time TP1 will be less than the first time threshold Pth1. Therefore, the answer is "NO" at step S43, the vehicle ECU 22 proceeds to step S46. At step S46, the vehicle ECU 22 determines that the relative position of the oncoming vehicle M2 is out of the potential collision area EA and terminates collision determination process.

At step S44, the vehicle ECU 22 calculates the second stay time TP2 based on the first stay time TP1 calculated at step S42 and the counting process at steps S52 and S53. Subsequently, at step S45, the vehicle ECU 22 determines whether the second stay time TP2 calculated at step S44 is greater than a predefined second time threshold Pth2. Here, the second time threshold Pth2 is set to a certain percent or more, e.g., 80%, of the second stay time TP2 if the relative position of the oncoming vehicle M2 continues to stay in the potential collision area EA from when the first Y-axis position YA passes through the reference position Y0 to when the first Y-axis position YA passes through the second position Y2. If the relative position of the oncoming vehicle M2 is less frequently out of the potential collision area EA during a time period from when the first Y-axis position YA passes through the reference position Y0 to when the first Y-position YA passes through the second position Y2, the second stay time TP2 is likely to be greater than the second time threshold Pth2. Therefore, the answer is "YES" at step S45, the vehicle ECU 22 terminates the collision determination process.

If the relative position of the oncoming vehicle M2 is more frequently out of the potential collision area EA during a time period from when the first Y-axis position YA passes through the reference position Y0 to when the first Y-position YA passes through the second position Y2, the second stay time TP2 is less than the second time threshold Pth2. Therefore, the answer is "NO" at step S45, the vehicle ECU 22 proceeds to step S46.

That is, at steps S43, S45, the vehicle ECU 22 determines whether the oncoming vehicle M2 has passed through the reference position Y0, the first position Y1, and the second position Y2 using the first and second time thresholds Pth1, Pth2. If the oncoming vehicle M2 slows down or stops, the stay times TP1 and TP2 fail to calculated at steps S42 and S44 because the oncoming vehicle M2 does not pass through the first position Y1 or second position Y2. In such a case, the vehicle ECU 22 terminates collision determination process without calculating the stay times TP1 and TP2.

Returning to FIG. 3, at step S16, the vehicle ECU 22 determines whether the result of determination at step S14 is that the relative position of the oncoming vehicle M2 is out of the potential collision area EA. At step S17, the vehicle ECU 22 determines whether at least one of the stay times TP1 and TP2 has been calculated at step S15. If the relative position of the oncoming vehicle M2 is out of the potential collision area EA ("YES" branch of step S16), the vehicle ECU 22 proceeds to step S25. If the relative position of the oncoming vehicle M2 is not out of the potential collision area EA ("NO" branch of step S16) and at least one of the stay times TP1 and TP2 has been calculated ("YES" branch of step S17), then the vehicle ECU 22 proceeds to step S25.

If the relative position of the oncoming vehicle M2 is not out of the potential collision area EA ("NO" branch of step S16) and none of the stay times TP1 and TP2 have been calculated ("NO" branch of step S17), then the vehicle ECU 22 proceeds to step S18. At step S18, the vehicle ECU 22 determines whether the own vehicle M1 is in a turning state. If the answer is "NO" at step S18, the vehicle ECU 22 terminates the collision-inhibiting control. If the answer is "YES" at step S18, the vehicle ECU 22 calculates a lateral distance CTD at step S19.

Then, at steps S20 and S21, the vehicle ECU 22 determines the likelihood of a collision between the own vehicle M1 and the oncoming vehicle M2 using the right-turn-of-oncoming-vehicle determination area EB and the slipping-past determination area EC. At step S20, the vehicle ECU 22 determines whether the relative position of the oncoming vehicle M2 acquired at step S12 is within the right-turn-of-oncoming-vehicle determination area EB. Specifically, the vehicle ECU 22 determines whether the second Y-axis position YB, which is a relative position of the oncoming vehicle M2 on the Y-axis in the second coordinate system, is greater than the first relative threshold Rth1 and the second X-axis position XB, which is a relative position of the oncoming vehicle M2 on the X-axis in the second coordinate system, is less than the first lateral threshold Dth1. If the answer is "YES" at step S20, the vehicle ECU 22 proceeds to step S25. If the answer is "NO" at step S20, the vehicle ECU 22 proceeds to step S21. In the present embodiment, the turn-of-moving-object determination unit 223 illustrated in FIG. 1B is responsible for execution of the process step S20.

At step S21, the vehicle ECU 22 determines whether the relative position of the oncoming vehicle M2 acquired at step S12 is within the slipping-past determination area EC. Specifically, the vehicle ECU 22 determines whether the second Y-axis position YB is less than the second relative threshold Rth2 and the second X-axis position XB is greater than the second lateral threshold Dth2. If the answer is "YES" at step S21, the vehicle ECU 22 proceeds to step S25. If the answer is "NO" at step S21, the vehicle ECU 22 proceeds to steps S22-S24 to perform collision-inhibiting control in which the safety devices 30 are activated based on the relative time-to-collision TTC. In the present embodiment, the slipping-past determination unit 224 illustrated in FIG. 1B is responsible for execution of the process step S21.

In collision-inhibiting control, first, at step S22, the vehicle ECU 22 calculates a lateral time-to-collision time CTT. Here, the lateral time-to-collision time CTT is acquired by dividing the lateral distance CTD calculated at step S19 by the lateral speed CV that is a speed of the own vehicle M1 in the lateral direction DY. The lateral time-to-collision time CTT is expressed using the lateral distance CTD and the lateral speed CV according to the following Equation 1.

$$CTT = CTD/CV \quad (1)$$

Figure 8:
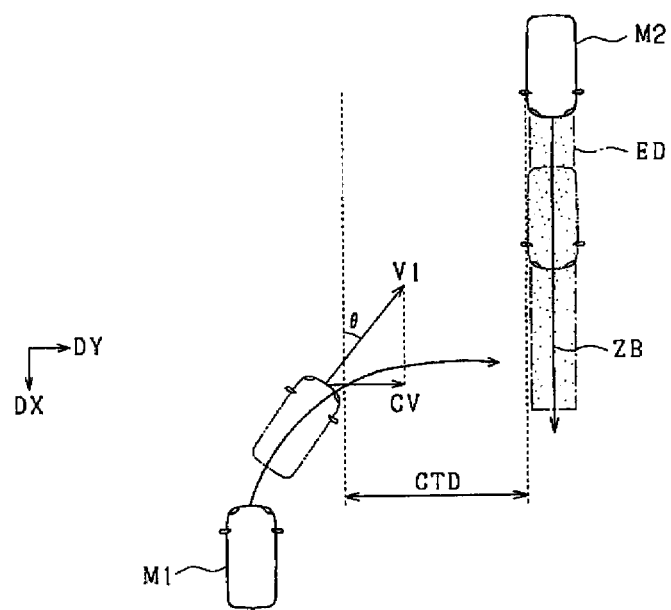
FIG. 8 is an illustration of a positional relationship between the own vehicle and the oncoming vehicle when the oncoming vehicle slips past the own vehicle making a right turn.

As illustrated in FIG. 8, when the oncoming vehicle M2 is traveling straight in the straight travel direction DX, the lateral distance CTD is a distance from the own vehicle M1 to a vehicle travel area ED defined along the straight travel path of the oncoming vehicle M2 in the lateral direction DY. The vehicle travel area ED is an area that has an own-vehicle M1 side boundary defined with respect to the lateral end, on the own vehicle M1 side, of the oncoming vehicle M2, has a width equivalent to a vehicle width in the lateral direction DY, and is set to extend along the straight travel direction DX of the oncoming vehicle M2.

The lateral speed CV is a lateral component of the own-vehicle speed V1, and is expressed using an angle θ between the straight travel direction DX of the oncoming vehicle M2 and the direction of travel of the own vehicle M1 in a turning state, and the own-vehicle speed V1, according to the following Equation (2).

$$CV = V1 \times \sin\theta \quad (2)$$

At step S23, the vehicle ECU 22 determines whether the lateral time-to-collision CTT calculated at step S22 is less than a predefined third time threshold Cth. In the answer is "YES" at step S23, the vehicle ECU 22 activates all or some of the safety devices 30 at step S24 and terminates this routine. If the answer is "NO" at step S23, the vehicle ECU 22 terminates this routine without activating the safety devices 30.

At step S25, the vehicle ECU 22 restricts activation of the safety devices 30 and terminates the collision-inhibiting control. Therefore, when activation of the safety devices 30 is restricted, the vehicle ECU 22 does not activate the safety devices 30 even when the lateral time-to-collision CTT is less than the third time threshold Cth. In the present embodiment, the restriction unit 225 illustrated in FIG. 1B is responsible for execution of the process step S25.

Collision-inhibiting control will now be described in more detail using FIGS. 5 to 10.

Figure 5B:
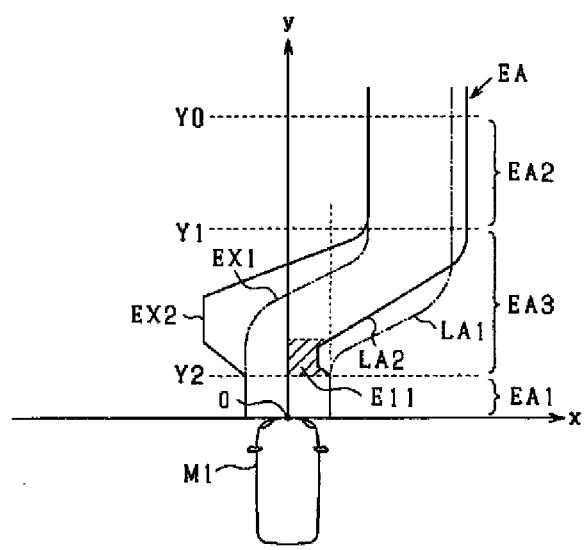

The potential collision area EA will now be described with reference to FIGS. 5A and 5B. FIGS. 5A and 5B illustrate the potential collision areas EA for different oncoming vehicle speeds V2. FIG. 5A illustrates the potential collision area EA for a relatively low oncoming vehicle speed V2, while FIG. 5B illustrates the potential collision area EA for a relatively high oncoming vehicle speed V2. FIG. 5B illustrates, as a comparative example, a potential collision area EA at a low speed indicated by dashed-dotted lines.

As illustrated in FIG. 5A, in collision-inhibiting control, the first to third areas EA1 to EA3, which are contiguous to each other, are set as the potential collision area EA. The first area EA1 is an area that indicates the location of the oncoming vehicle M2 in the path of travel C1 of the own vehicle M1, includes the origin of the first coordinate system, and has a width corresponding to the width of the own vehicle M1 in the x-axis direction. The first area EA1 is set in a constant x-axis range and in the y-axis range from the origin to the second position Y2.

The second area EA2 is an area that indicates the position of the oncoming vehicle M2 that is traveling straight forward from the far side in the y-axis direction, and is offset in the x-axis direction relative to the first area EA1 on the far side in the y-axis direction from the first area EA1. The second area EA2 is set in a constant x-axis range different from the first area EA1 and in the y-axis range from the first position Y1 to the reference position Y0.

The third area EA3 is an area that indicates the position of the oncoming vehicle M2 relative to the own vehicle M1 in a turning state, and is located between the first and second areas EA1 and EA2 in the y-axis direction, consecutively to these respective areas EA1 and EA2. Since the second area EA2 is offset in the x-axis direction from the first area EA1, the third area EA3, which is provided continuous to these respective areas EA1 and EA2, is set so that the farther away in the y-axis direction, the more the third area EA3 shifts away from the own vehicle M1 in the x-axis direction. The second area EA2 is set in the y-axis range from the second position Y2 to the first position Y1. That is, in the y-axis direction, the boundary between the second area EA2 and the third area EA3 is the first position Y1, and the boundary between the third area EA3 and the first area EA1 is the second position Y2.

The potential collision area EA is set based on the own vehicle speed V1 and the oncoming vehicle speed V2. Specifically, the vehicle ECU 22 stores a plurality of patterns of potential collision areas associated with the own vehicle speed V1 and the oncoming vehicle speed V2, and one of the potential collision areas EA is selected based on own vehicle speed V1 and the oncoming vehicle speed V2. In such a case, m speeds or speed regions are defined as the own vehicle speeds V1, n speeds or speed regions are defined as the oncoming vehicle speeds V2, and m×n potential collision areas EA are stored (m, n are natural numbers greater than or equal to 2). The potential collision area EA is selected according to which speed region the own vehicle speed V1 and the oncoming vehicle speed V2 fall into in each case. For example, 10 km/h, 15 km/h, and 20 km/h may be defined as the m own vehicle speeds V1, and 30 km/h, 40 km/h, and 50 km/h as the n oncoming vehicle speeds V2.

The potential collision area EA is set such that the higher the oncoming vehicle speed V2 is, the farther the right side boundary LA is shifted in the y-axis direction, where the right side boundary LA is the area boundary line on the right side of the own vehicle (the side to which the vehicle is turning or turn destination side) in the x-axis direction in the third area EA3. In such a case, the first position Y1 may be set to be farther in the y-axis direction in the same manner. Specifically, as illustrated in FIG. 5B, the right boundary line LA is defined as "LA1" at the low oncoming vehicle speed V2, and the right boundary line LA is defined as "LA2" at the high oncoming vehicle speed V2.

As illustrated in FIG. 5B, in the potential collision area EA used when the oncoming vehicle M2 is at high speed, a portion of area E11 in the y-axis direction and on the right side of the own vehicle in the x-axis direction is narrower in the x-axis direction than the first area EA1 (the hatched area in FIG. 5B), and the area E11 is narrower in the x-axis direction as the oncoming vehicle speed V2 is higher. That is, when the speed of the oncoming vehicle V2 is higher than the predefined speed (e.g., 40 km/h), the potential collision area EA is set so that a portion of the third area EA3 in the y-axis direction and on the right side of the own vehicle in the x-axis direction is narrower than the first area EA1.

The potential collision area EA is set such that the higher the oncoming vehicle speed V2 is, the more the left side area EX is extended to the left side of the own vehicle, where the area to the left in the x-axis direction (opposite from the direction in which the own vehicle turns) in the third area EA3 is defined as the left side area EX. Specifically, as illustrated in FIG. 5B, at the low oncoming vehicle speed V2, the left side area EX of the third area EA3 is defined as "EX1" with the same width in the x-axis direction as the first area EA1, and at the high oncoming vehicle speed V2, the left side area EX of the third area EA3 is defined as "EX2" which is extended in the x-axis direction than the first area EA1. At a high oncoming vehicle speed V2, the left side area of each of the first area EA1 and the third area EA3 may be configured to be extended to the left of the own vehicle more than at a low oncoming vehicle speed V2.

In the potential collision area EA, the area width W in the x-axis direction in the third area EA3 differs according to the oncoming vehicle speed V2, and the higher the oncoming vehicle speed V2 is, the wider the area width W is.

The potential collision area EA is set variably according to the own vehicle speed V1 in addition to the oncoming vehicle speed V2, such that the higher the own vehicle speed V1, the more the right side boundary line LA of the third area EA3 is shifted toward the near side in the y-axis direction.

Figure 6:
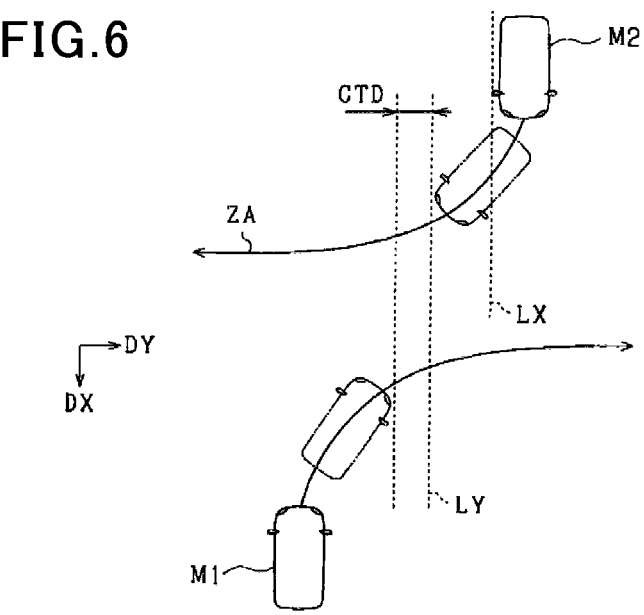
FIG. 6 is an illustration a positional relationship between the own vehicle and the oncoming vehicle when the own vehicle and the oncoming vehicle are making right turns.
Figure 7:
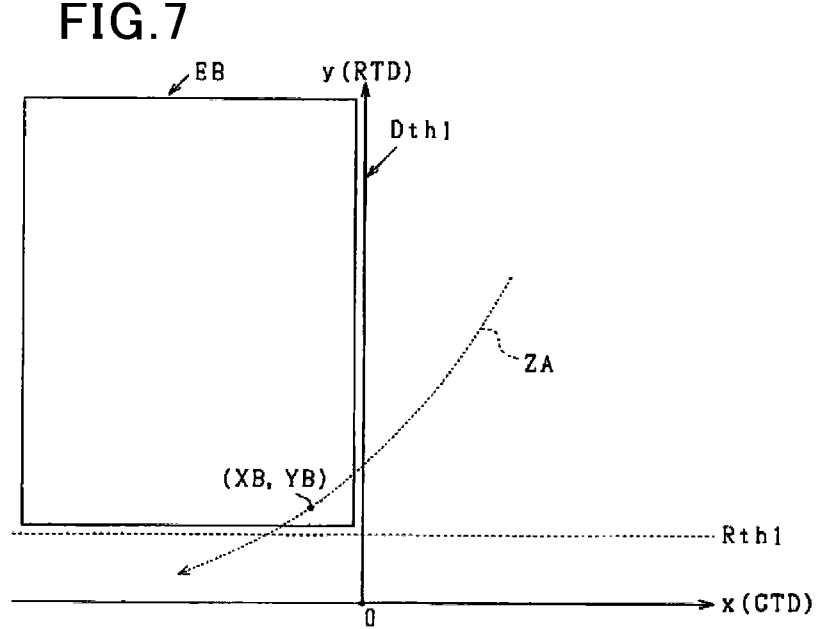
FIG. 7 is an illustration of a right-turn-of-oncoming-vehicle determination area.

As illustrated in FIG. 6 and FIG. 7, in collision-inhibiting control, the lateral distance CTD is calculated, and this lateral distance CTD is used to determine whether the relative position of the oncoming vehicle M2 is within the right-turn-of-oncoming-vehicle determination area EB. As indicated by the arrow ZA in FIG. 6, when the own vehicle M1 is making a right turn and the oncoming vehicle M2 is making a right turn, the lateral distance CTD is a distance between the right corner of the front end of the own vehicle M1 and the right corner of the front end of the oncoming vehicle M2 in the lateral direction DY. Specifically, the boundary line LX is defined according to the straight travel direction DX and the position of the oncoming vehicle M2 when the oncoming vehicle M2 is traveling straight forward. When the oncoming vehicle M2 makes a turn from traveling straight forward, the boundary line LY is defined by translating the boundary line LX according to the position of the oncoming vehicle M2. The lateral distance CTD is a distance between the right corner of the front end of the own vehicle M1 and the boundary line LY in the lateral direction DY.

The right-turn-of-oncoming-vehicle determination area EB is set based on the own vehicle speed V1 and the oncoming vehicle speed V2. Specifically, the first relative threshold Rth1 is associated with the own vehicle speed V1 and the oncoming vehicle speed V2. The vehicle ECU 22 stores a map MB in which the first relative threshold Rth1 is associated with the own vehicle speed V1 and the oncoming vehicle speed V2.

In the map MB, the higher the oncoming vehicle speed V2 or the higher the own vehicle speed V1, the greater the first relative threshold Rth1 is set to be. The first lateral threshold Dth1 is constant regardless of the own vehicle speed V1 and the oncoming vehicle speed V2 and is zero in the present embodiment. In the present embodiment, the first relative threshold Rth1 corresponds to a threshold value in the turn-of-moving-object determination unit and the first lateral threshold Dth1 corresponds to a predefined distance in the turn-of-moving-object determination unit.

Furthermore, as illustrated in FIG. 8, in collision-inhibiting control, the lateral distance CTD is used to determine whether the relative position of the oncoming vehicle M2 is within the slipping-past determination area EC. As indicated by the arrow ZB in FIG. 8, if the oncoming vehicle M2 slips past the front of the own vehicle M1 when the own vehicle M1 is making a right turn, the lateral distance CTD is a distance from the right corner of the front end of the own vehicle M1 to the vehicle travel area ED in the lateral direction DY.

When calculating the distance from the right corner of the front end of own vehicle M1 to the vehicle travel area ED in the lateral direction DY as the lateral distance CTD, the first X-axis position XA in the first coordinate system, the first Y-axis position YA in the first coordinate system, and an angle θ between the straight travel direction DX of the oncoming vehicle M2 and the travel direction of the own vehicle M1 during making a turn may be used to calculate the lateral distance CTD as follows.

Figure 9:
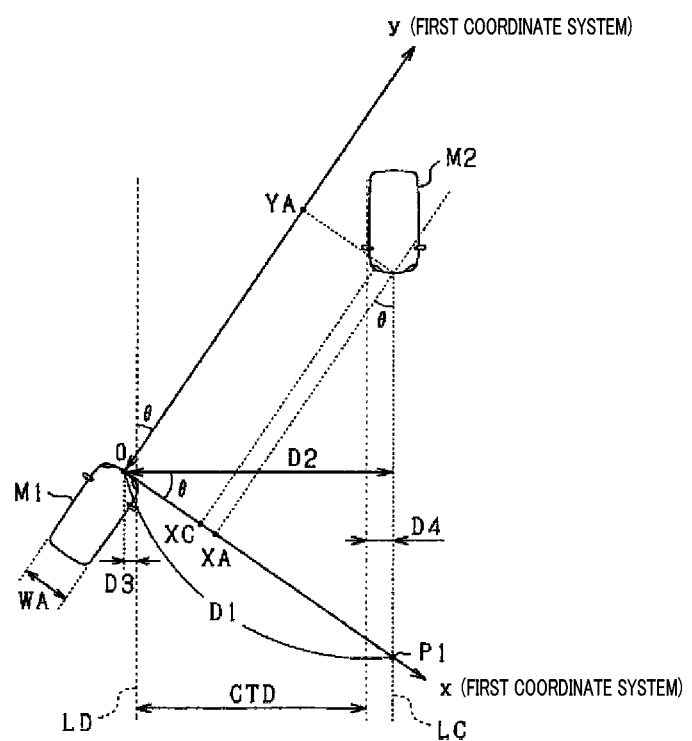
FIG. 9 is an illustration of how to calculate a lateral distance.

As illustrated in FIG. 9, supposing that P1 is an intersection of the x-axis in the first coordinate system and the virtual line LC extending along the straight travel direction DX through the center front end position of the oncoming vehicle M2, a distance D1 between the center of the front end of the own vehicle M1 (the origin in the first coordinate system) and the intersection point P1 is expressed using the first X-axis position XA, the first Y-axis YA, the angle θ, as follows.

$$D1 = XA + YA \times \tan\theta \tag{3}$$

In this case, a distance D2 from the origin in the lateral direction DY to the virtual line LC is expressed according to the following Equation 4 using the distance D1 and the angle θ.

$$D2 = D1 \times \cos\theta = XA \times \cos\theta + YA \times \sin\theta \tag{4}$$

The distance D2 is a sum of the lateral distance CTD and distances D3 and D4. The distance D3 is a distance from the origin in the lateral direction DY to the virtual line LD extending along the straight travel direction DX through the right corner of the front end of the own vehicle M1, and is expressed using the width WA of the own vehicle M1 and angle θ, as expressed in the following Equation 5.

$$D3 = (WA/2) \times \cos\theta \tag{5}$$

The distance D4 is half the width of the oncoming vehicle M2. Supposing that the x-axis coordinate of the right corner of the front end of the oncoming vehicle M2 in the first coordinate system is a third X-axis position XC, the distance D4 is expressed as the following Equation (6) using the first X-axis position XA, the third X-axis position XC, and the angle θ.

$$D4 = (XA - XC)/\cos\theta \tag{6}$$

Therefore, the lateral distance CTD can be expressed as the following Equation (7) using the Equations (4) to (6).

$$\begin{aligned}CTD &= D2 - D3 - D4 \\ &= XA \times \cos\theta + YA \times \sin\theta - (XA - XC)/\cos\theta - (WA/2) \times \cos\theta\end{aligned} \tag{7}$$

The Equation (7) is applicable when the angle θ is such that 0°≤θ≤90° while the own vehicle M1 is making a turn.

The slipping-past determination area EC is set based on the own vehicle speed V1 and the oncoming vehicle speed V2. Specifically, the second relative threshold Rth2 is associated with the own vehicle speed V1 and the oncoming vehicle speed V2, and the vehicle ECU 22 stores a map MC in which the first relative threshold Rth1 is associated with the own vehicle speed V1 and the oncoming vehicle speed V2.

In the map MC, the higher the oncoming vehicle speed V2 or the own vehicle speed V1 is, the greater the second relative threshold Rth2 is set to be. The second lateral threshold Dth2 is constant regardless of the own vehicle speed V1 and the oncoming vehicle speed V2, and is set to a value that increases as the lateral distance CTD increases, provided that the lateral distance CTD is positive. In the present embodiment, the second relative threshold value Rth2 corresponds to a threshold value in a slipping-past determination unit and the second lateral directional threshold value Dth2 corresponds to a predefined distance in the slipping-past determination unit.

The present embodiment described in detail above can provide the following advantages.

(A1) In the present embodiment, based on the own vehicle speed V1 and the oncoming vehicle speed V2, the potential collision area EA is set as an area where the own vehicle M1 is likely to collide with the oncoming vehicle M2 when the oncoming vehicle M2 moves in its direction of travel and the own vehicle M1 turns to make a right turn. Based on the position of the oncoming vehicle M2 relative to the own vehicle M1 being out of the potential collision area EA, activation of the safety devices 30 against the oncoming vehicle M2 is restricted. When the own vehicle M1 makes a right/left turn, the assumed position of the oncoming vehicle M2 in the first coordinate system may differ according to the own vehicle speed V1 and the oncoming vehicle speed V2. Thus, in the present embodiment, the potential collision area EA is set based on at least one of own vehicle speed V1 and oncoming vehicle speed V2, which may allow the location of oncoming vehicle M2 to be properly determined. This may properly inhibit unnecessary activation of the safety devices 30 when the own vehicle M1 makes a right/left turn.

(A2) In the present embodiment, the potential collision area EA is set as the potential collision area EA in the first coordinate system where the x-axis is in the lateral direction of the own vehicle M1, the y-axis is in the direction of travel of the own vehicle M1, and the origin is at the own vehicle position. In this case, the likelihood of a collision with the oncoming vehicle M2 may be properly determined based on the orientation of the own vehicle M1 that is making a turn. In particular, when the own vehicle M1 makes a right/left turn and there is an oncoming vehicle M2 on its left/right side, it is possible to properly determine whether the own vehicle M1 is likely to collide with the oncoming vehicle M2 according to whether the oncoming vehicle M2 is on the front side, the right side or the left side with respect to the own vehicle M1 in a turning state.

(A3) In the present embodiment, the potential collision area EA is set to include the first to third areas EA1-EA3. The second area EA2 is located farther away in the y-axis direction from the first area EA1 immediately in front of own vehicle M1 and is offset in the x-axis direction from the first area EA1. The third area EA3 is set between the first area EA1 and the second area EA2 and is continuous with these areas EA1 and EA3, such that the more distant side in the y-axis direction shifts toward the side away from the own vehicle M1 in the x-axis direction. In this case, for example, when the own vehicle M1 turns right, the potential collision area EA may be set appropriately taking into account that, on the far side in the y-axis direction, the position of the oncoming vehicle M2 is on the right side in the x-axis direction and that oncoming vehicle M2 is gradually displaced to the left side in the x-axis direction as the own vehicle M1 turns. That is, the third area EA3 is set to shift in the x-axis direction to correspond to turning of own vehicle M1. Therefore, it may properly determine whether the own vehicle M1 in a turning state is likely to collide with an oncoming vehicle M2.

(A4) The higher the oncoming vehicle speed V2, the more likely the oncoming vehicle M2 is to slip past the front of the own vehicle M1 before the own vehicle M1 crosses the oncoming lane L2 at the intersection CR. In this regard, according to the present embodiment, when the oncoming vehicle speed V2 is high, the right boundary line LA, which is the boundary line of the third area EA3 on the right side of the own vehicle in the x-axis direction (on the turn destination side of the own vehicle), is shifted to the far side in the y-axis direction as compared to when the oncoming vehicle speed V2 is low. This can suppress unwanted activation at the time of slipping past for an oncoming vehicle M2 that is slipping past at a high speed.

(A5) The higher the own vehicle speed V1, the less likely the oncoming vehicle M2 is to slip past the front of the own vehicle M1 before the own vehicle M1 crosses the oncoming lane L2. In this regard, according to the present embodiment, the higher the own vehicle speed V1 is, the more the right boundary line LA of the third area EA3 is shifted toward the near side of the y-axis direction. This can preferably inhibit occurrence of a collision between the own vehicle M1 that is crossing the oncoming lane L2 at a high speed and the oncoming vehicle M2.

(A6) When the own vehicle M1 is making a turn, it may be assumed that the oncoming vehicle M2, which was located on the right side of the own vehicle during the first half of the turn, may move straight forward from the left side of the own vehicle (opposite side from of the own vehicle's turn destination side) during the second half of the turn. The higher the speed of the oncoming vehicle V2 is, the more caution is required with respect to the oncoming vehicle M2 traveling straight forward from the left side of its own vehicle. In this regard, according to the present embodiment, when the oncoming vehicle speed V2 is high, the third area EA3 is extended to the left side of the own vehicle in the x-axis direction as compared to when the oncoming vehicle speed V2 is low. This can preferably inhibit occurrence of a collision between the own vehicle M1 and the oncoming vehicle M2 approaching the own vehicle M1 at a high speed.

(A7) On the other hand, the higher the oncoming vehicle speed V2, the less attention is required for the oncoming vehicle M2 located on the right side of the own vehicle. When the speed of the oncoming vehicle V2 is high, even if the oncoming vehicle M2 is located to the right in front of the own vehicle M1 that is making a turn at the intersection CR, the oncoming vehicle M2 is expected to slip past the front of the own vehicle quickly. In this regard, according to the present embodiment, when the oncoming vehicle speed V2 is high, the potential collision area EA is set such that a portion of the third area EA3 in the y-axis direction and on the turn destination side of the own vehicle in the x-axis direction is narrower than the first area EA1, as compared to when the oncoming vehicle speed V2 is low. This can suppress unwanted activation during the oncoming vehicle M2 slipping past the own vehicle M1 at a high speed.

(A8) The x-axis position of the oncoming vehicle M2 passing through the third area EA3 is more varied in the near side of the y-axis direction than in the far side of the y-axis direction. The higher the oncoming vehicle speed V2, the greater the x-axis directional variation in the near side of the y-axis direction may be. In this regard, according to the present embodiment, when the oncoming vehicle speed V2 is high, the width W of the third area EA3 in the x-axis direction is extended, as compared to when the oncoming vehicle speed V2 is low. This can preferably inhibit occurrence of a collision with the oncoming vehicle M2 approaching the own vehicle M1 at a high speed.

(A9) If the position of the oncoming vehicle M2 relative to the own vehicle M1 is within the potential collision area EA at a certain timing, but the position of the oncoming vehicle M2 does not move along the potential collision area EA, the position of the oncoming vehicle M2 relative to the own vehicle M1 is out of the potential collision area EA. The likelihood of the own vehicle M1 colliding with the oncoming vehicle M2 is reduced. In this regard, according to the present embodiment, the reference position Y0 is set in the y-axis direction as the end position of the far side of the first area EA1, the first position Y1 is set as the boundary between the second area EA2 and the third area EA3, and the second position Y2 as the boundary between the third area EA3 and the first area EA1. If at least one of the following conditions is not met: (1) the position of the oncoming vehicle M2 continues to stay in the potential collision area EA for the first stay time TP1 or more from when the oncoming vehicle M2 passes through the reference position Y0 to when the oncoming vehicle M2 passes through the first position Y1, and (2) the position of the oncoming vehicle M2 continues to stay in the potential collision area EA for the second stay time TP2 or more from when the oncoming vehicle M2 passes through the reference position Y0 to when the oncoming vehicle M2 passes through the second position Y2, activation of the safety devices 30 against the oncoming vehicle M2 is restricted. This can suppress unwanted activation of the safety devices 30 against the oncoming vehicle M2 whose position does not move along the potential collision area EA.

(A10) In the present embodiment, it is determined whether the lateral distance CTD becomes less than the first lateral direction threshold Dth1 before the relative distance RTD becomes less than the first relative threshold Rth1. In response to determining that the lateral distance CTD becomes less than the first lateral direction threshold Dth1 before the relative distance RTD becomes less than the first relative threshold Rth1, activation of the safety devices 30 against the oncoming vehicle M2 is restricted. In this case, the likelihood of a collision with the oncoming vehicle M2 can be properly determined based on the lateral distance CTD and the relative distance RTD. In particular, in the scene where the oncoming vehicle M2 turns right toward the own vehicle M1 while the own vehicle M1 is turning right toward the oncoming vehicle, unnecessary activation of the safety devices 30 can be suppressed because the lateral distance CTD becomes less than the first lateral threshold Dth1 before the relative distance RTD becomes less than the first relative threshold Rth1.

(A11) In the present embodiment, it is determined whether the lateral distance CTD becomes greater than the second lateral threshold Dth2 after the relative distance RTD becomes less than the second relative threshold Rth2. In response to determining that the lateral distance CTD becomes greater than the second lateral threshold Dth2 after the relative distance RTD becomes less than the second relative threshold Rth2, activation of the safety devices 30 against the oncoming vehicle M2 is restricted. In this case, the likelihood of a collision with the oncoming vehicle M2 can be properly determined based on the lateral distance CTD and the relative distance RTD. In a scene where the oncoming vehicle M2 slips past the front of the own vehicle M1 when the own vehicle M1 is turning right toward the oncoming vehicle M2, the lateral distance CTD is kept greater than the second lateral threshold Dth2 even after the relative distance RTD becomes less than the second relative threshold Rth2, which can suppress unnecessary actuation of the safety devices 30.

(A12) The higher the own vehicle speed V1, the earlier the turn start timing of the own vehicle M1, and the higher the oncoming vehicle speed V2, the earlier the turn start timing of the oncoming vehicle M2. The earlier the timing of the start of turn of the own vehicle M1 and the oncoming vehicle M2, the more the behaviour of the oncoming vehicle M2 relative to the own vehicle M1 will change at a position where the oncoming vehicle M2 is relatively far from the own vehicle M1. In this regard, according to the present embodiment, the higher the oncoming vehicle speed V2 is or the higher the own vehicle speed V1 is, the greater the relative threshold values Rth1 and Rth2 are set. This allows the relative thresholds Rth1 and Rth2 to be set in response to changes in the behaviour of the oncoming vehicle M2 relative to the own vehicle M1, which can preferably inhibit occurrence of a collision with the oncoming vehicle M2 using the lateral distance CTD.

Other Embodiments

The above embodiments may be modified and implemented as follows.

(O1) In the above embodiment, the example has been described where the moving object is the oncoming vehicle M2 traveling straight forward in the oncoming lane L2. Alternatively, the moving objects may be bicycles or pedestrians H1, H2 moving straight forward from the opposite direction from the direction of travel of the own vehicle M1.

Figure 11:
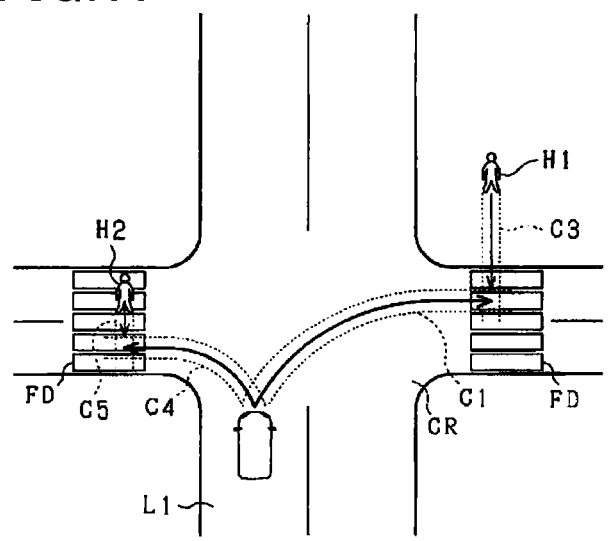
FIG. 11 is an illustration of a positional relationship between the own vehicle and a pedestrian when the own vehicle is making a right/light turn.

Specifically, as illustrated in FIG. 11, the own vehicle M1 traveling straight in its own lane L1 may turn right or left at the intersection CR, thereby crossing the pedestrian crossing FD provided at the intersection CR. When the own vehicle M1 turns right at intersection CR, the path of travel C1 of the own vehicle M1 may intersect the path of movement C3 of the pedestrian H1 who is moving straight through the crosswalk FD on the right-turn side. When the own vehicle M1 turns left at the intersection CR, the path of travel C4 of travel of the own vehicle M1 intersects the path of movement C5 of the pedestrian H2 who is moving straight through the crosswalk FD on the left turn side. Therefore, the vehicle ECU 22 activates the safety devices 30 to inhibit collision with the pedestrian H1 or H2, and also sets each area EA-EC for the pedestrian H1 or H2.

Figure 12:
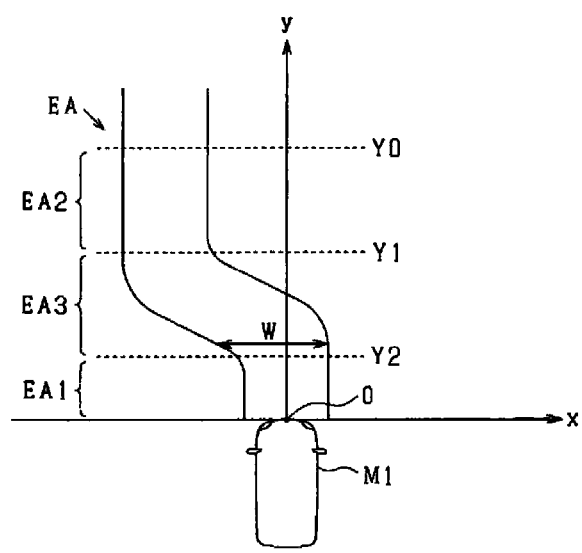
FIG. 12 is an illustration of a potential collision area for a pedestrian.

FIG. 12 illustrates the potential collision area EA that is set for the pedestrian H2 moving straight through the crosswalk FD on the left-turn side. Since the pedestrian H2 is slower than the oncoming vehicle M2 traveling in the oncoming lane L2, the first position Y1 is set to be closer in the y-axis direction in the potential collision area EA set for the pedestrian H2. In the potential collision area EA set for the pedestrian H2, the areas on the left side of the own vehicle (on the turn destination side of the own vehicle) and on the right side of the own vehicle (on the opposite side from the turn destination side of the own vehicle) in the x-axis direction are set to be narrow in the third area EA3. Therefore, in the potential collision area EA set for the pedestrian H2, the area width W, which is the width in the x-axis direction, is set to be smaller.

Figure 13:
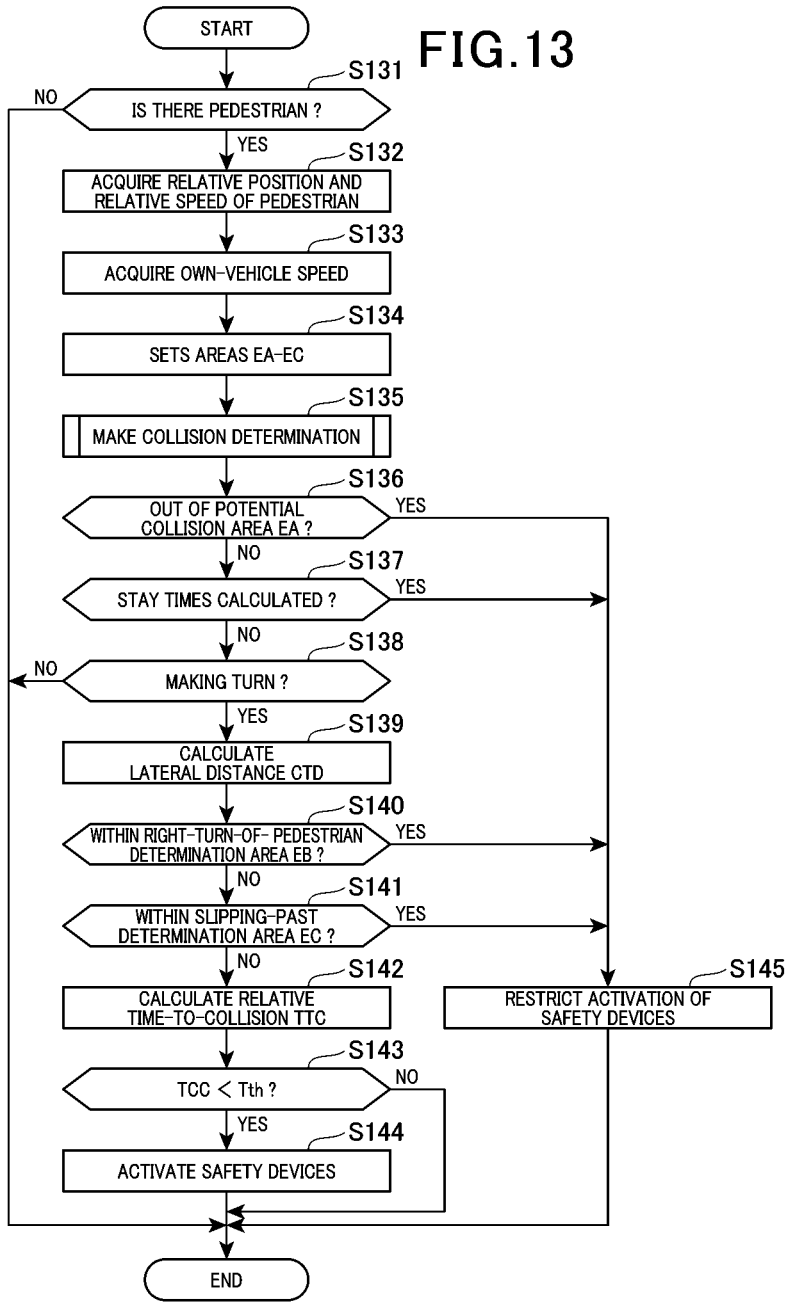
FIG. 13 is a flowchart of a collision-inhibiting control process targeting a pedestrian.

FIG. 13 illustrates a flowchart of collision-inhibiting control for the pedestrian H2 moving straight forward across the crosswalk FD on the left-turn side. In collision-inhibiting control, assuming that the moving object is a bicycle or pedestrian H1, H2, the safety devices 30 are activated based on the relative time-to-collision TTC instead of the lateral time-to-collision CTT. Specifically, at step S142, the relative time-to-collision TTC is calculated. The relative time-to-collision TTC is expressed according to following Equation (8) using the relative distance RTD and the relative velocity RV.

$$TTC=RTD/RV \tag{8}$$

In the present embodiment, the relative distance RTD is the distance between the own vehicle M1 and the oncoming vehicle M2 in the direction of travel of the own vehicle M1.

At step S143, the vehicle ECU 22 determines whether the relative time-to-collision TTC calculated at step S142 is less than a predefined fourth time threshold Tth. If the answer is "YES" at step S143, the vehicle ECU 22 activates the safety devices 30 at step S144 and terminates this process. If the answer is "NO" at step S143, the vehicle ECU 22 terminates this process without activating the safety devices 30.

The potential collision area EA may be set not only for the bicycle or pedestrian H1, H2 moving straight forward in the opposite direction from the straight travel direction of the own vehicle M1, but also for the bicycle or pedestrian H1, H2 moving straight forward in the same direction as the straight travel direction of the own vehicle M1.

(O2) In the above embodiment, the example has been described where the stay times TP1 and TP2 are used to determine whether the relative position of the oncoming vehicle M2 is out of the potential collision area EA. A first absence time TQ1 that is a length of time for which the relative position YA of the oncoming vehicle M2 continues to be absent in the potential collision area EA from when the first Y-axis position YA passed through the reference position Y0 to when the first Y-axis position YA passed through the first position Y1, and a second absence time TQ2 that is a length of time for which the relative position of the oncoming vehicle M2 continues to be absent in the potential collision area EA from when the first Y-axis position YA passes through the reference position Y0 to when the first Y-axis position YA passes through the second position Y2, may be used to determine whether the relative position of the oncoming vehicle M2 is out of the potential collision area EA. In addition, the stay times TP1, TP2 and the absence times TQ1, TQ2 may be used to determine whether the relative position of the oncoming vehicle M2 is out of the potential collision area EA.

(O3) In the above embodiment, the example of setting the areas EA-EC based on the own vehicle speed V1 and the oncoming vehicle speed V2 has been described. Alternatively, each of the areas EA-EC may be set based only on the own vehicle speed V1, or each of the areas EA-EC may be set based only on the oncoming vehicle speed V2.

(O4) The above embodiment, an example in which the plurality of potential collision areas EA patterns associated with the own vehicle speed V1 and the oncoming vehicle speed V2 are stored in the vehicle ECU 22. Various parameters for setting the potential collision area EA, such as the slope of the right boundary line LA and the area of area E11, are associated with the own vehicle speed V1 and the oncoming vehicle speed V2. The vehicle ECU 22 may store a map MA in which these various parameters are associated with the own vehicle speed V1 and the oncoming vehicle speed V2.

(O5) In the above embodiment, the example of using the relative distance RTD as the y-axis in the second coordinate system has been described. Alternatively, the distance to the oncoming vehicle M2 in the direction of travel of the own vehicle M1 may be used.

(O6) In the above embodiment, an example of the collision-inhibiting control process has been described in the case of the left-hand traffic road. In the case of the right-hand traffic road, the similar process may be applied by reversing the left and right sides of the road.

(O7) In the above embodiment, the configuration for object detection using the detection results from the cameras 11, which are monocular cameras, and the detection results from the radar devices 12, i.e., the configuration for detecting objects by a fusion technique, was used. Alternatively, for example, stereo cameras may be used as the cameras 11, and objects may be detected based on the detection results of the stereo cameras.

(O8) In the above embodiment, an example in which the vehicle ECU 22 corresponds to the vehicle control device has been described. Alternatively, a combination of the image processing ECU 21 and the vehicle ECU 22 may correspond to the vehicle control device. That is, the vehicle control device may generate detection information on moving objects around the own vehicle based on the images captured by the cameras 11.

(O9) The vehicle control device and the method thereof described in the present disclosure may be realized by a dedicated computer provided by configuring a processor and memory programmed to perform one or more functions embodied in a computer program. Alternatively, the vehicle control unit and the method thereof described in the present disclosure may be realized by a dedicated computer provided by configuring a processor with one or more dedicated hardware logic circuits. Alternatively, the vehicle control device and the method thereof described in the present disclosure may be realized by one or more dedicated computers configured by a combination of a processor and memory programmed to perform one or more functions, and a processor configured with one or more hardware logic circuits. In addition, the computer program may be stored in a computer-readable, non-transitory tangible storage medium as instructions to be executed by a computer.

Although the present disclosure has been described in accordance with the above-described embodiments, it is not limited to such embodiments and structures, but also encompasses various variations and variations within equal scope. In addition, various combinations and forms, as well as other combinations and forms, including only one element, more or less, thereof, are also within the scope and idea of the present disclosure.

What is claimed is:

1. A vehicle control device for activating a safety device of a vehicle to inhibit occurrence of a collision with a moving object around an own vehicle when the own vehicle transitions from traveling straight in a lane in which the own vehicle is traveling to making a turn, the own vehicle being the vehicle carrying the safety device, the vehicle control device comprising:
    a processor;
    a non-transitory computer-readable storage medium; and
    a set of computer-executable instructions stored on the non-transitory computer-readable storage medium that cause the processor to:
      set a potential collision area, based on at least one of an own vehicle speed, which is a speed of the own vehicle, and a moving object speed, which is a speed of the moving object, where the own vehicle is likely to collide with the moving object, provided that the moving object continues to move in its moving direction and the own vehicle is making a right/left turn;

acquire a position of the moving object relative to the own vehicle; and restrict activation of the safety device against the moving object based on the position of the moving object that is acquired being out of the potential collision area that is set, wherein for a state in which activation of the safety device is not restricted, the vehicle control device is configured to activate the safety device to inhibit a collision between the own vehicle and the moving object.

2. The vehicle control device according to claim 1, wherein the set of computer-executable instructions further cause the processor to set the potential collision area in a coordinate system where an x-axis is in a lateral direction of the own vehicle, a y-axis is in a direction of travel of the own vehicle, and an origin is the position of the own vehicle.

3. The vehicle control device according to claim 2, wherein the set of computer-executable instructions further cause the processor to set, as the potential collision area, a first area including the origin of the coordinate system and has a width in an x-axis direction corresponding to a width of the own vehicle, a second area on a far side in a y-axis direction, the second area being offset in the x-axis direction from the first area and indicating the position of the moving object moving from the far side in the y-axis direction toward the own vehicle, and a third area between the first and second areas in the y-axis direction, continuous with each of the first and second areas, the third area indicating the position of the moving object relative to the own vehicle while the own vehicle is making the right/left turn.

4. The vehicle control device according to claim 3, wherein the moving object is an oncoming vehicle traveling straight forward in an oncoming lane, and the set of computer-executable instructions further cause the processor to set, based on an oncoming vehicle speed that is a speed of the oncoming vehicle, the potential collision area such that, when the oncoming vehicle speed is high, a boundary line of the third area on a turn destination side of the own vehicle in the x-axis direction is shifted to the far side in the y-axis direction as compared to when the oncoming vehicle speed is low.

5. The vehicle control device according to claim 3, wherein the moving object is an oncoming vehicle traveling straight forward in an oncoming lane, and the set of computer-executable instructions further cause the processor to set, based on an oncoming vehicle speed that is a speed of the oncoming vehicle, the potential collision area such that, when the oncoming vehicle speed is higher than a predefined speed, a portion of the third area in the y-axis direction and on a turn destination side of the own vehicle in the x-axis direction is narrower than the first area, as compared to when the oncoming vehicle speed is low.

6. The vehicle control device according to claim 3, wherein the moving object is an oncoming vehicle traveling straight forward in an oncoming lane, and the set of computer-executable instructions further cause the processor to set, based on an oncoming vehicle speed that is a speed of the oncoming vehicle, the potential collision area such that, when the oncoming vehicle speed is high, the third area is extended on an opposite side from a turn destination side of the own vehicle in the x-axis direction as compared to when the oncoming vehicle speed is low.

7. The vehicle control device according to claim 3, wherein the moving object is an oncoming vehicle traveling straight forward in an oncoming lane, and the set of computer-executable instructions further cause the processor to set, based on an oncoming vehicle speed that is a speed of the oncoming vehicle, the potential collision area such that, when the oncoming vehicle speed is high, a width of the third area in the x-axis direction is extended, as compared to when the oncoming vehicle speed is low.

8. The vehicle control device according to claim 3, wherein the set of computer-executable instructions further cause the processor to set the potential collision area based on the speed of the own vehicle, such that when the speed of the own vehicle is high, a boundary line of the third area on a turn destination side of the own vehicle is shifted toward a near side in the y-axis direction as compared to when the speed of the own vehicle is low.

9. The vehicle control device according to claim 3, wherein the moving object is an oncoming vehicle traveling straight forward in an oncoming lane, and the set of computer-executable instructions further cause the processor to set, in the y-axis direction, a reference position as a farthermost position from the first area, a first position as a boundary between the second area and the third area, and a second position as a boundary between the third area and the first area, and restrict activation of the safety device against the oncoming vehicle, in response to at least one of following conditions being not met: (1) the position of the oncoming vehicle continues to stay in the potential collision area for a first stay time or more from when the oncoming vehicle passes through the reference position to when the oncoming vehicle passes through the first position, and (2) the position of the oncoming vehicle continues to stay in the potential collision area for a second stay time or more from when the oncoming vehicle passes through the reference position to when the oncoming vehicle passes through the second position.

10. A vehicle control device for activating a safety device of a vehicle to inhibit occurrence of a collision with a moving object that is moving straight from an opposite side from a straight travel direction of an own vehicle, when the own vehicle transitions from traveling straight in a lane in which the own vehicle is traveling to making a turn, the own vehicle being the vehicle carrying the safety device, the vehicle control device comprising:

a processor;

a non-transitory computer-readable storage medium; and a set of computer-executable instructions stored on the non-transitory computer-readable storage medium that cause the processor to:

when the own vehicle makes a right/left turn, determine whether a lateral distance that is a distance between the own vehicle and the moving object in a lateral direction orthogonal to a direction of movement of the moving object that is moving straight forward, is less than a predefined threshold value before a relative distance between the own vehicle and the moving object becomes less than a predefined distance; and restrict activation of the safety device against the moving object based on a determination that the lateral distance is less than the predefined threshold value, wherein for a state in which activation of the safety device is not restricted, the vehicle control device is configured to activate the safety device to inhibit a collision between the own vehicle and the moving object.

11. The vehicle control device according to claim 10, wherein the moving object is an oncoming vehicle traveling straight forward in an oncoming lane, and the set of computer-executable instructions further cause the processor to set the predefined distance to a larger value as an oncoming vehicle speed that is a speed of the oncoming vehicle is higher, or as an own vehicle speed that is a speed of the own vehicle is higher.

12. A vehicle control device for activating a safety device of a vehicle to inhibit occurrence of a collision with a moving object that is moving straight from an opposite side from a straight travel direction of an own vehicle, when the own vehicle transitions from traveling straight in a lane in which the own vehicle is traveling to making a turn, the own vehicle being the vehicle carrying the safety device, the vehicle control device comprising:

a processor;

a non-transitory computer-readable storage medium; and a set of computer-executable instructions stored on the non-transitory computer-readable storage medium that cause the processor to:

when the own vehicle makes a right/left turn, determine whether a lateral distance that is a distance between the own vehicle and the moving object in a lateral direction orthogonal to a direction of movement of the moving object that is moving straight forward, is greater than a predefined threshold value after a relative distance between the own vehicle and the moving object becomes less than a predefined distance; and restrict activation of the safety device against the moving object based on a determination that the lateral distance is greater than the predefined threshold value, wherein for a state in which activation of the safety device is not restricted, the vehicle control device is configured to activate the safety device to inhibit a collision between the own vehicle and the moving object.

13. The vehicle control device according to claim 12, wherein the moving object is an oncoming vehicle traveling straight forward in an oncoming lane, and the set of computer-executable instructions further cause the processor to set the predefined distance to a larger value as an oncoming vehicle speed that is a speed of the oncoming vehicle is higher, or as an own vehicle speed that is a speed of the own vehicle is higher.

* * * * *